United States Patent [19]

Pihlström et al.

[11] Patent Number: 4,930,799
[45] Date of Patent: Jun. 5, 1990

[54] TILTABLE TRAILER FOR MOTOR VEHICLES, ESPECIALLY PASSENGER CARS

[75] Inventors: Anund Pihlström; Bernt Pihlström, both of Hudiksvall, Sweden

[73] Assignee: Systemvagnar AB, Upsala, Sweden

[21] Appl. No.: 264,054

[22] Filed: Oct. 28, 1988

[51] Int. Cl.⁵ .................................... B60P 3/06
[52] U.S. Cl. .................... 280/400; 280/402; 280/769; 414/494; 414/495; 414/500
[58] Field of Search ............... 280/400, 414.1, 415.1, 280/769, 402; 414/483, 494, 495, 498, 500, 559; 296/181, 182, 183

[56] References Cited

U.S. PATENT DOCUMENTS

| | | | |
|---|---|---|---|
| 3,458,074 | 7/1969 | Railey | 414/483 |
| 3,661,286 | 5/1972 | Smith | 280/414.1 |
| 3,682,337 | 8/1972 | May et al. | 414/498 |
| 3,722,948 | 3/1973 | Walsh et al. | 414/500 |
| 3,857,504 | 12/1974 | Bausenbach et al. | 414/500 |
| 3,931,895 | 1/1976 | Grimaldo | 414/495 |
| 3,987,919 | 10/1976 | Weeks et al. | 414/494 |
| 4,114,854 | 9/1978 | Clark | 414/495 |

FOREIGN PATENT DOCUMENTS 1430217 3/1969 Fed. Rep. of Germany ...... 414/494
3437854 10/1984 Fed. Rep. of Germany .

Primary Examiner—Charles A. Marmor
Assistant Examiner—Anne Marie Boehler
Attorney, Agent, or Firm—Bacon & Thomas

[57] ABSTRACT

A tiltable trailer is disclosed having a wheel-mounted chassis with a frame element (3) pivotable between a horizontal travelling position and a backwardly-downwardly inclined position. The frame element (3) has longitudinal guide (12, 12') along which a basic frame (2) is displaceable, the basic frame being included in each of a plurality of different add-on units forming a series, and, locking device (16) for securing, at least in the travelling position, the basic frame (2) to the pivotable frame element (3), the trailer further having a winch (23) by means of which the basic frame (2) can be hauled up on the inclined frame element from a position behind the frame element to a position coinciding with that of the frame element, in which latter position the locking device can secure the basic frame to the frame element.

16 Claims, 4 Drawing Sheets

TILTABLE TRAILER FOR MOTOR VEHICLES, ESPECIALLY PASSENGER CARS

TECHNICAL FIELD OF THE INVENTION

The invention relates to a tiltable trailer for motor vehicles, especially passenger cars, comprising a wheel-mounted chassis having at least one frame element pivotable relative to the wheels between a substantially horizontal travelling position and a backwardly-downwardly inclined position in which the rear portion of said frame element rests against the ground or base.

BRIEF DESCRIPTION OF THE INVENTIVE IDEA

It is the object of the present invention to develop prior art trailers of the type described above such that the trailers can be rapidly modified in a simple and economic manner to fit a variety of applications. This and other objects are achieved in accordance with the characteristic features of the invention in that the above-mentioned frame element comprises on the one hand longitudinal guide means along which a basic or standard frame is displaceable, said basic frame being included in each of a plurality of different add-on units forming a series, such as loading platforms, access ramps, boat trailers, wiremesh boxes, transport frames, tanks, sky-lifts, containers, caravans, sheds or the like, and, on the other hand, locking means for securing, at least in said travelling position, said basic frame to said pivotable frame element, said trailer further comprising a winch or transfer device, by means of which said add-on unit can be hauled or otherwise conveyed up on said inclined frame element from a position in which it stands on the ground behind said frame element, to a position coinciding with that of the frame element, in which latter position the locking means can secure the add-on unit to the frame element.

According to the inventive principle, one and the same wheel-mounted chassis can thus be modified rapidly and rationally for different applications by mounting a desired add-on unit included in a commercially obtainable series of such units.

BRIEF DESCRIPTION OF THE ACCOMPANYING DRAWINGS

In the drawings:

FIG. 1 is a perspective view of a trailer designed according to the invention and a basic frame for an add-on unit, FIG. 2 is a lateral view of the same trailer in two different functional positions, FIG. 3a–3i show a number of different add-on units in a perspective view, FIG. 4 is an enlarged, lateral view, partly in section, of the tiltable frame element, FIGS. 5 and 6 are views along lines V—V and VI—VI, respectively, in FIG. 4, FIG. 7 shows an enlarged detail of a lever arrangement included in the trailer, and FIG. 8 is a lateral view of an alternative embodiment.

DETAILED DESCRIPTION OF A PREFERRED EMBODIMENT OF THE INVENTION

Figure 1:
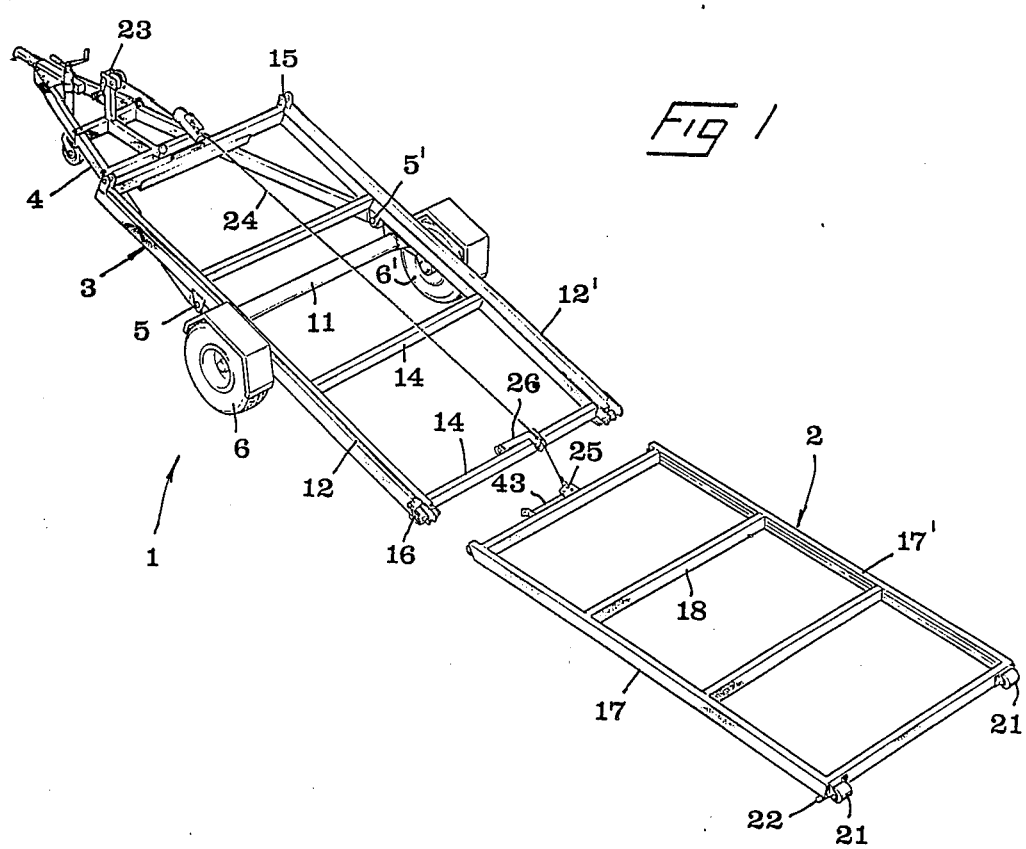
Figure 2:
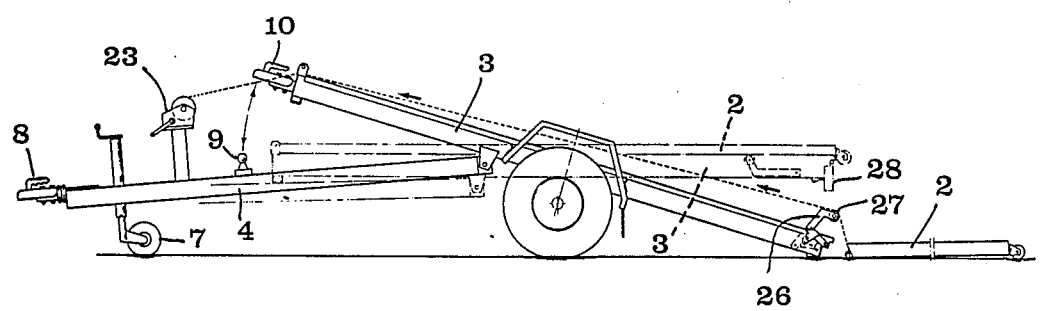
Figures 3A, 3B, 3C:
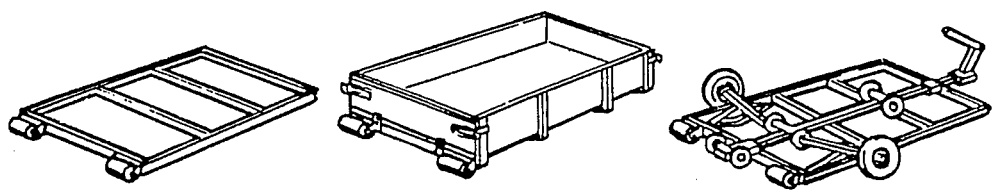
Figures 3D, 3E:
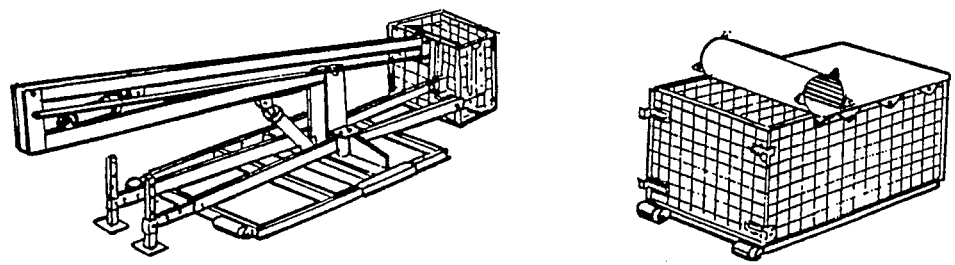
Figures 3F, 3G:
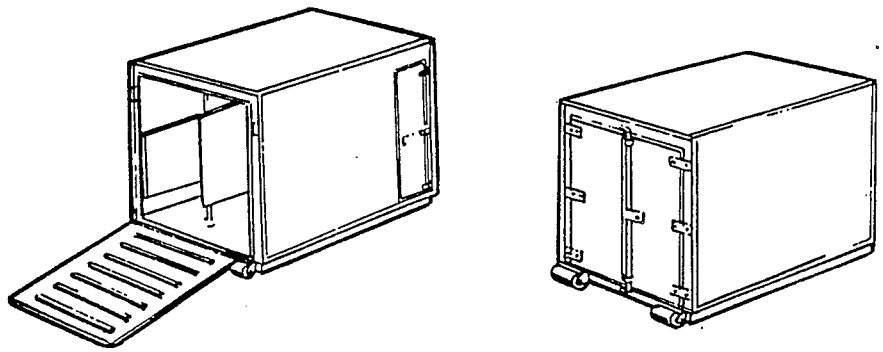
Figures 3H, 3I:
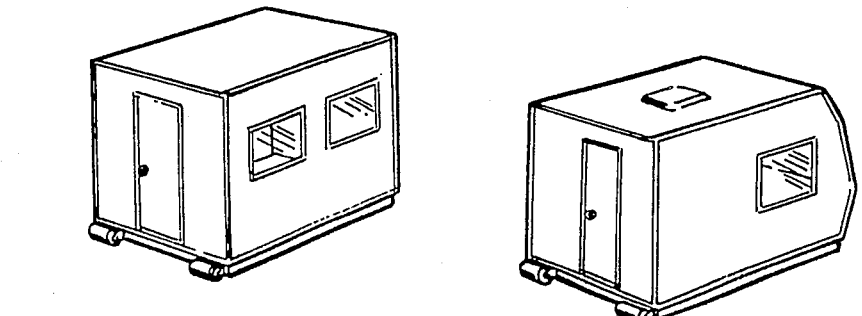

FIGS. 1 and 2 illustrate a trailer designated 1 in its entirety and a basic or standard frame 2 which is included in each of a plurality of add-on units forming in a series, some of said units being exemplified in FIG. 3. Optionally, the basic frame 2 itself can be an add-on unit on which, in turn, special arrangements are mounted which are not included in the standard series. The trailer 1 comprises a chassis which, in the embodiment shown, is divided into two elements 3, 4 which are, in per se known manner, pivotably interconnected via hinges 5, 5', and of which the rear element 3 is, in conventional manner, supported by a pair of wheels 6, 6'. The front frame element 4 comprises a conventional adjustable support wheel 7 and a conventional connecting member 8 for connection to the coupling ball of a passenger car or some other motor vehicle. A ball coupling tap 9 is also mounted on the front frame element 4 to cooperate with a second connecting member 10 on the front portion of the frame element 3, more precisely such that the frame element 3 is secured to the frame element 4 when the connecting member 10 engages with the ball coupling tap 9, and the frame elements are free to pivot relative to each other as soon as the connecting member has been disengaged from the ball coupling tap. An axle 11 for the wheels 6, 6' may preferably include a torsion spring system for the spring action of the wheels relative to the chassis The trailer type described above is per se previously known and conventional.

According to the invention, the pivotable frame element 3 comprises, in this case, two longitudinal guide means, along which the basic frame 2 is displaceable. In the embodiment described, these guide means are L-sections 12, 12' which are fixedly attached to the upper surface of the longitudinal box girders 13 which, together with the cross-beams 14, constitute the frame element 3. At the front end of each such L-section, there is a stop member 15, and at the rear end there is a locking member 16. The components of these stop and locking members are shown in more detail in FIGS. 4–6.

The base frame 2 is, like the frame element 3, composed of two longitudinal box girders 17, 17' and a number of cross-beams 18 (in this case four). At the front end of each longitudinal girder 17, 17', there are arranged a travelling wheel 19 and a catch member 20 (see also FIG. 4) for cooperation with the stop member 15 on the frame element 3. Also the rear end of the basic frame 2 is provided with travelling wheels 21 to facilitate movement of the basic frame and the add-on unit, respectively, on the ground where the trailer is parked. Moreover, the rear portion of the basic frame 2 is provided with lock pins 22 adapted to cooperate with the locking members 16.

On the front frame element 4, there is mounted a winch 23 which in this case is hand-operated and comprises a wire 24, the free end of which can be connected to the basic frame 2, in e.g. an attachment hole 25. On the inside of the rear cross-beam 14 of the frame element 3, there is mounted, via a bracket, a pivotable arm 26, the free end of which is provided with a guide wheel 27 for the wire or cable 24. As is best shown in FIG. 2, the arm 26 can be raised to an upright active position when the basic frame 2 or the add-on unit is to be hauled up on the frame element 3, and the arm will be lowered automatically to a horizontal inactive position under the basic frame 2, when the basic frame is hauled up on the chassis. Thus, the arm 26 provided with the guide wheel renders it possible to move the front end of the basic frame 2 included in the add-on unit a short distance from the ground, such that the front end of the basic frame goes clear of the per se low rear end portion of the frame element 3.

FIG. 2 shows the frame element 3 and the associated basic frame 2 in a horizontal travelling position indicated by dash-dot lines. It is here shown that a per se known bank of lights 28 is mounted on the rear portion of the frame element 3 in the travelling position, while the bank of lights has been removed when the frame element 3 is in its inclined, tilted position.

Figure 4:
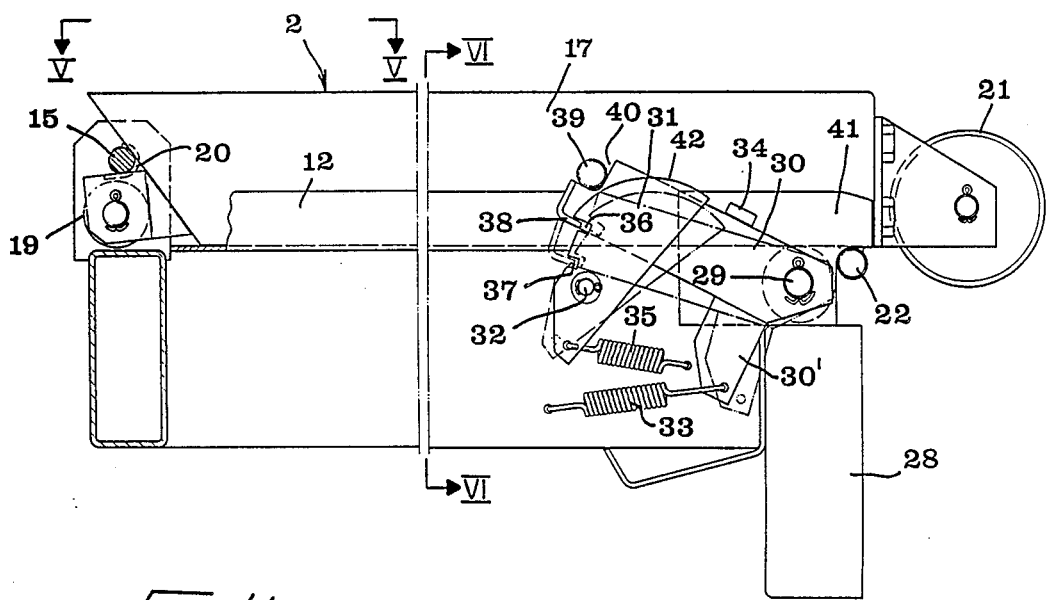
Figure 5:
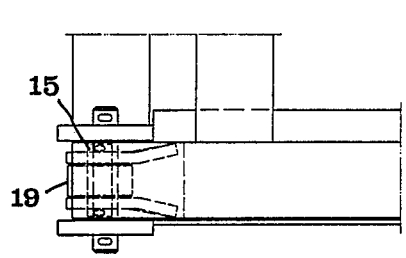
Figure 6:
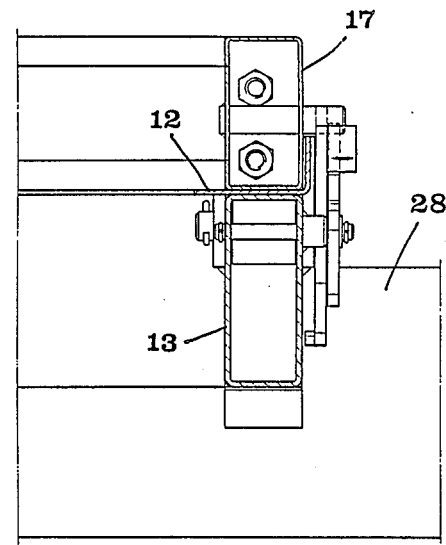

Reference is now made to FIGS. 4–6 in which the above-mentioned stop member 15 consists of a transverse pin mounted between upright lugs, while the catch member 20 consists of an arcuate sheet metal piece which opens forwardly away from the basic frame 2. Obviously, when the pin 15 engages with the arcuate metal sheet, the basic frame cannot move either forwards or upwards from the position shown in FIG. 4.

The locking member designated 16 in its entirety comprises a main arm 30 pivoted about a first hinge 29 and an auxiliary arm 31 which is pivotably movable about a second hinge 32. A first tension spring 33 strives to pivot the main arm 30 in a clockwise direction about the hinge 29 (up to an abutment 34), while a second tension spring 35 strives to move the auxiliary arm 31 in a counterclockwise direction about the hinge 32. The auxiliary arm 31 is provided with two spaced-apart notches or recesses 36, 37 with which a projection 38 on the free end of the main arm 30 can engage alternatingly. On the outside of the longitudinal girder 17 of the basic frame 2, there is provided a stop pin 39 which in a locking position engages with an angular recess 40 in the free end of the main arm 30. In this position, also the pin 22 engages beneath a rearward projection 41 on the frame element 3.

The locking member as described functions in the following manner. In the initial position, when the add-on unit and its associated basic frame 2 are to be hauled up on the frame element 3, the main arm 30 is set in the position which is shown by full lines in FIG. 4 and in which it abuts against the abutment shoulder 34. When, in the final stage of the movement of the basic frame 2 along the guide means 12, 12', the pin 39 engages with the arcuate edge 42 of the auxiliary arm 31, the arm is pressed down and pivoted in a clockwise direction against the action of the spring 35, whereby the projection 38 disengages from the notch 36. This means that the main arm 30 is released to pivot downwards in a counterclockwise direction about the pin 29, whereby the pin 39, during its continued movement moves to the left, can press down the main arm and engage with the angular recess 40 (which occurs at the same time as the front stop pin 15 engages with the sheet metal piece 20 serving as a catch member). After the pin 39 has passed the arcuate edge 42 and engaged with the recess 40, the projection 38 is automatically moved into engagement with the notch 36 by the action of the springs 33 and 35, whereby the arm 30 is locked in the state shown by full lines. In this state, it is impossible to move the basic frame 2 rearwards, at the same time as the pin 22 secures that the basic frame cannot move upwards relative to the frame element 3. In this state, it is also possible to mount the bank of lights 28.

When the add-on unit is to be removed from the frame element 3, the locking member must first be released manually. First, the bank of lights 28 is removed so as to allow the main arm 30 to pivot downwards, whose perpendicularly projecting portion 30' would otherwise interfere with the space accommodating the bank of lights. In the next step, the auxiliary arm 31 is conducted manually in a clockwise direction about the hinge 32 at least a distance such that the projection 38 disengages from the notch 36, whereupon the main arm 30 is pivoted downwards such that the projection 30 can be moved into engagement with the lower notch 37 of the auxiliary arm 31, i.e. to the position which in FIG. 4 is shown by dash-dot lines. In this position, the main arm 30 no longer prevents the pin 39 from passing to the right in FIG. 4. When the pin 39 passes the arcuate edge 42 of the auxiliary arm 31, the arm is pressed down such that the projection disengages from the notch 37 and can pass up to the notch 36. In other words, the main arm 30 is again pivoted up to its initial position shown by full lines.

Figure 7:
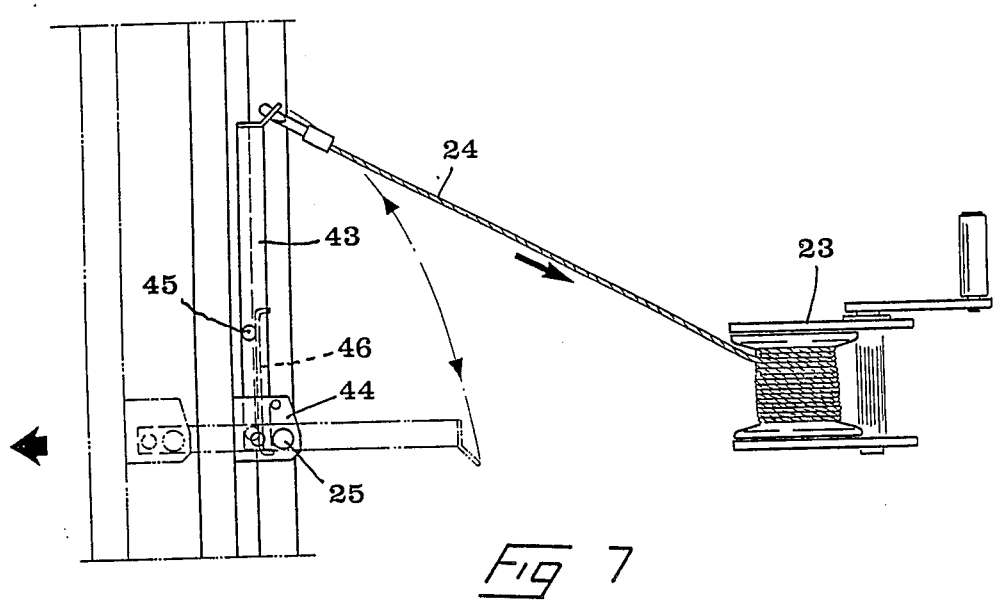

Reference is now made to FIG. 7 which shows how the wire 24 of the winch device 23 can be connected to a lever 43 mounted on the front end of the basic frame 2. One end of the lever is provided with a hinged block 44 (in which the connection hole 25 is formed), and at a distance from this block, there is provided a pin 45 which can engage behind a clamp 46 on the frame element 3. When the wire 24 is pulled, the lever 43 will pivot about the pin 45 (which at the same time is moved along the clamp 46), whereby the block 44 is caused to move to the left in FIG. 7. This renders it possible to move the add-on unit and the basic frame such a distance along the frame element 3 that the center of gravity of the add-on unit is moved beyond the position in which the frame element 3 begins to pivot downwards to its tilted, inclined position. Subsequently, the continued movement of the add-on unit can be effected automatically or, optionally, partly also by hand.

Reference is further made to FIG. 3 which illustrates some examples of add-on units included in the series of add-on units. FIG. 3a shows the basic frame 2 as such, FIG. 3b a demountable body, FIG. 3c a boat trailer, FIG. 3d a crane structure in the form of a sky-lift, FIG. 3e a wiremesh box with a tarpaulin cover, for carrying dead-wood or the like, FIG. 3f shows a horse box, FIG. 3g a container, FIG. 3h a shed, and FIG. 3i a caravan superstructure. The same series may also contain an optional number of further add-ons for other purposes.

Figure 8:
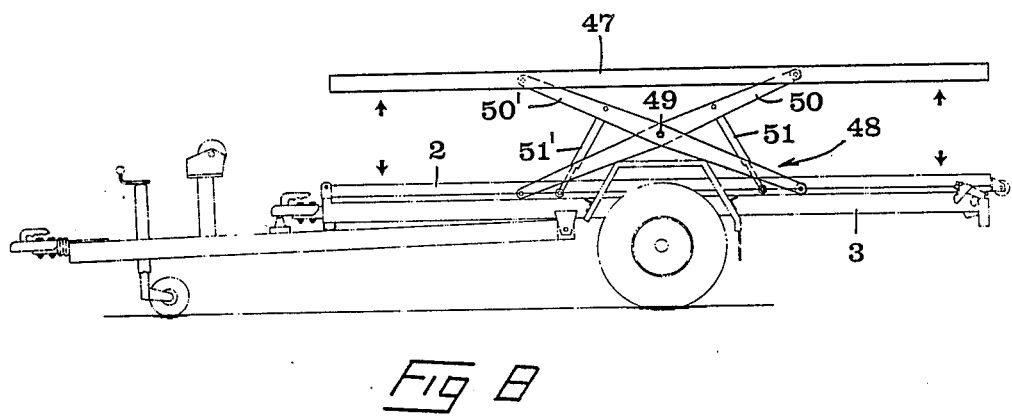

In the embodiment shown in FIG. 8, a support element 47 in the form of a table or platform is connected to the rear frame element 3 and is movable in vertical direction relative to the basic frame 2. More precisely, the platform or support element 47 is connected to the basic frame 2 via at least one or, most suitably, two scissor arm mechanisms generally designated 48. In actual practice, such a mechanism is preferably mounted on each of the two opposite longitudinal sides of the basic frame, each mechanism comprising, in per se known manner, two arms 50, 50' interconnected via a central hinge 49. One end of each arm is hinged to the frame 2 and the support element 47, respectively, while the opposite end of each arm is provided with a travelling wheel which is slidable and can roll along the lower side of the support element and the upper side of the frame, respectively. In the example shown, each arm is connected to a hydraulic cylinder 51, 51' which provides for the necessary pivoting movements of each arm. The two scissor arm mechanisms ensure that the support element 47 is kept in parallel with the basic frame 2. It should here also be noted that the support element 47 preferably has a surface area of approximately the same size as that of the basic frame 2.

We claim:

1. A tiltable trailer for motor vehicles, especially passenger cars, comprising: a wheel-mounted chassis having at least one frame element (3) pivotable relative to a plurality of wheels (6) between a substantially horizontal travelling position and a backwardly-downwardly inclined position in which the rear portion of said frame element rests against the ground or base, said frame element (3) comprising longitudinal guide means (12, 12') along which a basic frame (2) is displaceable, said basic frame being included in each of a plurality of different add-on units forming a series; locking means (20, 16) for securing, at least in said travelling position, said basic frame (2) to said pivotable frame element (3) said locking member (16) comprising: (i) two spring-loaded pivotal arms (30, 31), a main arm (30) adapted, in its locking state, to cooperate with a stop member (39) on said basic frame (2), and an auxiliary arm (31) adapted to normally secure said main arm in its locking position, said auxiliary arm (31) being, when said basic frame is hauled up on said pivotable frame element (3), moved aside to a position in which said main arm is free to yield away from said stop member (39) and allows it to enter into locking engagement with said main arm, and being, when said basic frame is pushed off from said frame element, manually settable in a position in which said auxiliary arm holds said main arm (30) in a turned-away position in which it is disengaged from said stop member; and, a winch transfer device (23), by means of which said add-on-unit can be hauled or otherwise conveyed up on said frame element in its inclined position from a position in which it stands on the ground behind said frame element, to a position coinciding with that of said frame element (3), in which latter position said locking means can secure said add-on unit to said frame element.

2. A trailer as claimed in claim 1, wherein said winch (23) is mounted at the chassis front end, and that the rear end of said pivotable frame element (4) is provided with a spacer arm (26) which is movable between an inactive position in which it is retracted under said add-on unit, and an active position in which it is pivoted upwards and, slightly backwards from said frame element so as to guide a wire or the like (24) from said winch to the add-on unit and its associated basic frame (2) which are to be hauled up on the trailer.

3. A trailer as claimed in claim 1, further comprising a stop member (15) arranged at the front end of said frame element (3) to engage with a catch member (20) on said basic frame (2), said members jointly preventing said basic frame from moving forwards or upwards relative to said frame element (3); and, at least one locking member (16) provided at the rear end of said frame element (3) adapted, with said basic frame (2) is hauled up on said frame element (3), to automatically lock said basic frame and prevent displacement thereof backwards relative to said frame element (3).

4. A trailer as claimed in claim 1, wherein said chassis divided into two frame elements (3,4) interconnected via hinges (5,5'), said frame elements being mutually lockable in a substantially horizontal position by means of at least one connecting member (10).

5. A trailer as claimed in claim 1 wherein said main arm is pivotable only after removal of a bank of lights (28) from a rear end of said frame element.

6. A trailer as claimed in claim 1 further comprising a lever (43) connected to said basic frame, said lever being connectible to said winch and adapted, when said basic frame is pushed off from said frame element, to provide an initial displacement of said basic frame relative to said frame element a distance such that the center of gravity of said base frame and its associated add-on unit is moved beyond the point in which said frame element begins to pivot into its downwardly tilted, inclined position.

7. A trailer as claimed in claim 1 further comprising a support element (47), in the form of a table or platform, connected to said basic frame (2) and vertically movable relative to said basic frame so as to facilitate, when required, setting the same at a desired raised level, in particular on a level with a loading ramp.

8. A trailer as claimed in claim 7, wherein said support element (47) has a surface area of substantially the same size as said basic frame (2) and is settable in optional vertical positions in which it extends substantially in parallel with said basic frame (2).

9. A trailer as claimed in claim 7 wherein said support element (47) is movable in vertical direction by means of at least one scissor type arm mechanism (48).

10. A tiltable trailer for motor vehicles, especially passenger cars, comprising: a wheel-mounted chassis having at least one frame element (3) pivotable relative to a plurality of wheels (6) between a substantially horizontal travelling position and a backwardly-downwardly inclined position in which the rear portion of said frame element rests against the ground or base, said frame element (3) comprising longitudinal guide means (12, 12') along which a basic frame (2) is displaceable, said basic frame being included in each of a plurality of different add-on units forming a series; locking means (20, 16) for securing, at least in said travelling position, said basic frame (2) to said pivotable frame element (3); a winch transfer device (23), by means of which said add-on unit can be hauled or otherwise conveyed up on said inclined frame element from a position in which it stands on the ground behind said frame element, to a position coinciding with that of said frame element (3), in which latter position said locking means can secure said add-on unit to said frame element; and, a lever (43) connected to said basic frame, said lever being connectible to said winch and adapted, when said basic frame is pushed off from said frame element, to provide an initial displacement of said basic frame relative to said frame element a distance such that the center of gravity of said base frame and its associated add-on unit is moved beyond the point in which said frame element begins to pivot into its downwardly tilted, inclined position.

11. A trailer as claimed in claim 10, wherein said winch (23) is mounted at the chassis front end, and that the rear end of said pivotable frame element (4) is provided with a spacer arm (26) which is movable between an inactive position in which it is retracted under said add-on unit, and an active position in which it is pivoted upwards and slightly backwards from said frame element so as to guide a wire or the like (24) from said winch to the add-on unit and its associated basic frame (2) which are to be hauled up on the trailer.

12. A trailer as claimed in claim 10 further comprising a stop member (15) arranged at the front end of said frame element (3) to engage with a catch member (20) on said basic frame (2), said members jointly preventing said basic frame from moving forwards or upwards relative to said frame element (3), and at least one locking member (16) provided at the rear end of said frame element (3) adapted, when said basic frame (2) is hauled up on said frame element (3), to automatically lock said basic frame and prevent displacement thereof backwards relative to said frame element (3).

13. A trailer as claimed in claim 10 wherein said chassis is divided into two frames elements (3,4) interconnected via hinges (5,5'), said frame elements being mutually lockable in a substantially horizontal position by means of at lest one connecting member (10).

14. A trailer as claimed in claim 10 further comprising a support element (47), in the form of a table or platform, connected to said basic frame (2) and vertically movable relative to said basic frame so as to facilitate, when required, setting the same at a desired raised level, in particular on a level with a loading ramp.

15. A trailer as claimed in claim 14 wherein said support element (47) has a surface area of substantially the same size as said basic frame (2) and is settable in optional vertical positions in which it extends substantially in parallel with said basic frame (2).

16. A trailer as claimed in claim 14 wherein said support element (47) is movable in vertical direction by means of at least one scissor type arm mechanism (48).

* * * * *